Patented Feb. 12, 1929.

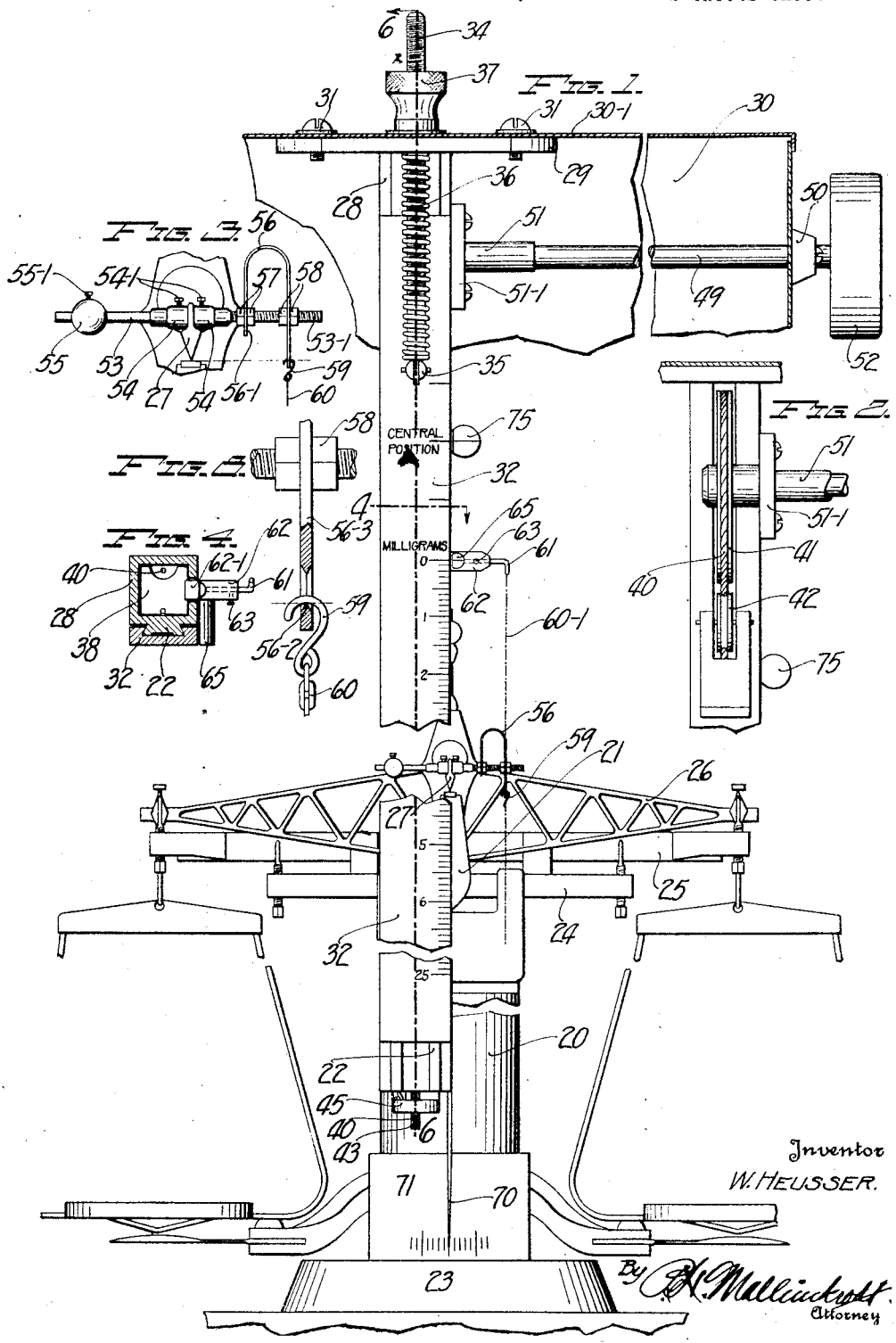

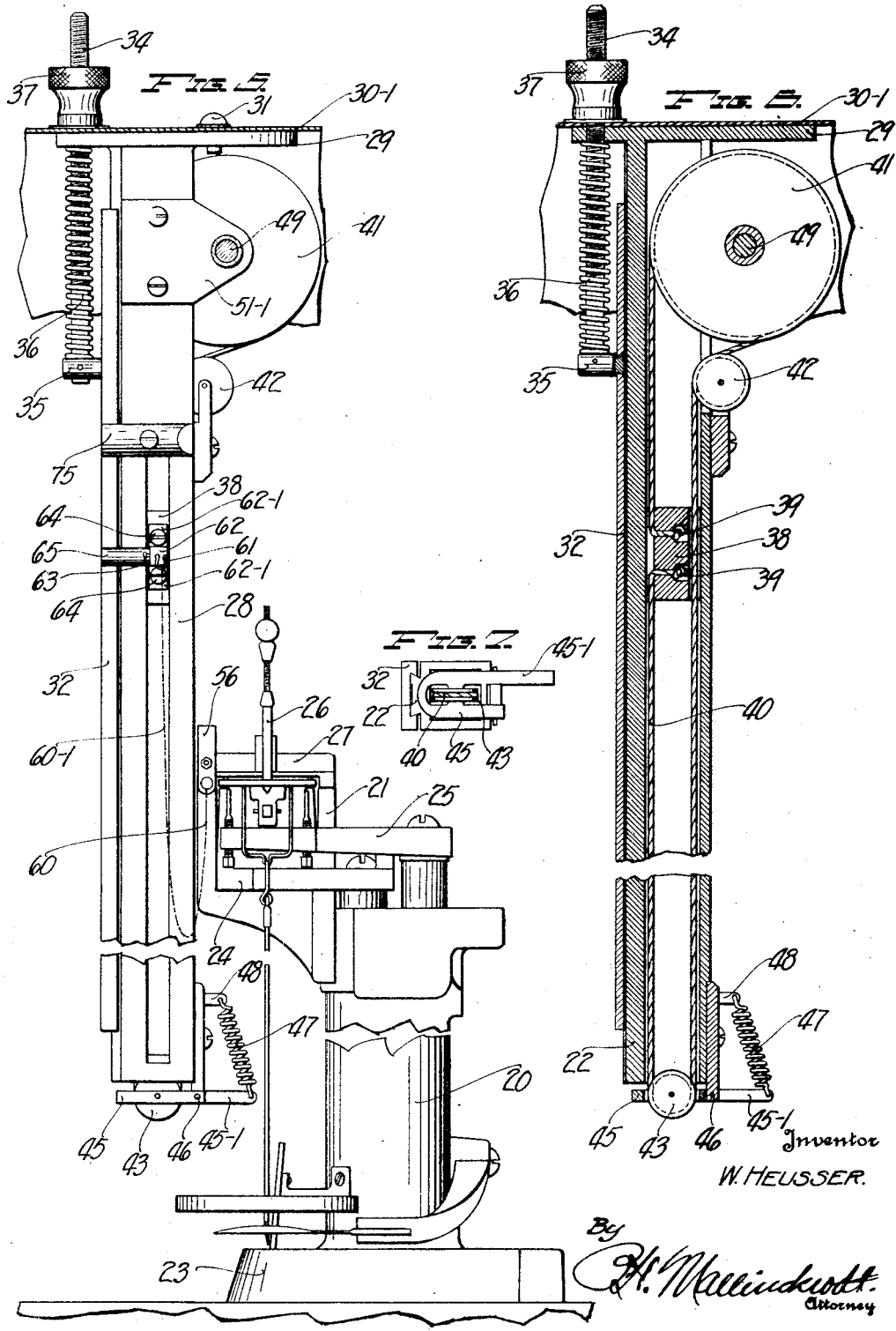

1,702,006

UNITED STATES PATENT OFFICE.

WILFRID HEUSSER, OF SALT LAKE CITY, UTAH.

VARIABLE-WEIGHT BALANCE.

Application filed March 29, 1927. Serial No. 179,281.

This invention relates to a variable weight balance, and its principal objects are:

First. To render the operation of precise weighing more rapid.

Second. To increase the convenience to the operator.

Third. To be simple and efficient.

Fourth. To be durable and not likely to get out of order.

While this invention is particularly applicable to precision balances, its utility is not restricted thereto.

Precise weighing, such as is used in analytical work, is usually a slow and tedious operation. To facilitate the more speedy execution of any weighing operation, so-called chain balances were evolved. Chain balances as previously constructed, I have found however, leave much to be desired in the way of rapid, convenient manipulation and refinement of details.

In a precision balance, the three main parts for minute load determination, include ($a$) a double lever or beam mounted for oscillation; ($b$) a device for indicating the angular deflection of the beam; ($c$) a weight. Any of these three elements, with the proper modifications, may be used for determining fractional parts or subdivisions of a small weight.

By subdividing the beam lengthwise, and by shifting a weight of suitable form over these divisions, I have the well known rider method, where a constant weight is used in conjunction with a variable lever. This makes use of the first method.

By noting the deflection of the beam for a known weight, and by subdividing this deflection, I make use of the second or deflectory method.

By having a variable weight acting upon a constant lever, I make use of the third method, which is fully treated in the present specification.

In the drawings, which illustrate one embodiment of the present invention incorporated with one type of analytical balance as regularly manufactured in my establishment, Fig. 1 represents a front elevation, parts broken away;

Fig. 2, a fragmentary portion of the rear elevation reflected from a mirror plane;

Fig. 3, an enlargement of a detail;

Fig. 4, a section on line 4, Fig. 1;

Fig. 5, a side elevation, parts broken away;

Fig. 6, a section on line 6—6, Fig. 1;

Fig. 7, a bottom plan, corresponding to Fig. 6, reflected from a mirror plane; and Fig. 8, a detail shown in Fig. 3, further enlarged.

Referring to the drawing, 20 indicates the usual center column of the balance. On this column are mounted the beam bearing support 21, the beam support 24, and the hanger support 25, all in the usual manner. The beam 26 is carried by the rigidly connected center edge 27.

Immediately in front of the center column is the guide column 28, but in order to leave the working space unobstructed, the column 28 is preferably attached at its upper end, by means of the flange 29 and the screws 31, to the top 30—1 of the balance casing 30. The depending arrangement of column 28 thus provides a clear space between its lower end and the base 23 of the balance.

Slidably engaging the front of the column 28 by means of dovetail 22, is the weight scale 32; this may be graduated to represent small units of weight and fractional parts thereof, in the present instance, milligrams and tenths of milligrams. The weight scale is made vertically adjustable, for a purpose presently to be explained, by means of the threaded stem 34, which is pivoted at its lower end to the stud 35 rigidly attached to the weight scale. A compression spring 36 is strung on the lower part of stem 34, and acts to push the weight scale downwardly. Counteracting the spring 36 is the knurled nut 37, which is threaded on the stem 34. By turning the nut 37, the weight scale may be raised or lowered along the column 28.

Slidably mounted, inside the column 28, is the adjusting block 38, and secured in block 38, by means of the knotted ends 39, is the flexible cord 40 or its equivalent. This cord passes around the friction sheave 41, the guide sheave 42, and the tension sheave 43, the latter being rotatably mounted in the yoke 45, pivotally supported at 46. The yoke 45 has the lever arm 45—1 which is engaged by one end of the tension spring 47, the other end of the spring being hooked in the stationary lug 48. Thus, the resiliency of spring 47 is exerted to constantly tension the cord 40.

The friction sheave 41 is rigidly mounted on the shaft 49 which is journaled in the bearings 50 and 51. Bearing 51 is integral with the bracket flange 51—1, which latter is rigidly fastened to the column 28. Fixed on the outer end of the shaft 49 is the hand wheel 52. By rotating the hand wheel 52 in opposite directions, the block 38 will be moved up or down as the case may be.

The relation of the mechanism thus far described, to the variable weight chain, will now be made clear.

Integral with the front part of the center edge 27 are the hubs 54, through which passes the longitudinally extending stem 53 rigidly held in place in the hubs by the set screws 54—1. One end 53—1 of the stem 53, is threaded and carries the auxiliary edge 56. This edge may be substantially in the shape of the letter U inverted, one leg 56—1 thereof, being adjustably held between the nuts 57, while the other and longer leg is adjustably held between the nuts 58. Thus the auxiliary edge may be moved towards, and away from, the center of oscillation of the beam. Suspended from the auxiliary edge, by means of the hook 59, is what I choose to call the "live end" 60 of the chain 60—1 which constitutes the variable weight. The other end of the chain is secured to the hook 61 whose stem is movable in or out on the arm 62, and which may be secured therein in its correct position, by the set screw 63. The arm 62 is rigidly fastened to the block 38 by means of the screws 64 passing through the lugs 62—1. Projecting forwardly from the arm 62 is the weight indicator 65, which carries on its front face, an indicating mark arranged to register with the various subdividing marks on the weight scale.

The auxiliary edge 56 and appurtenances are counterbalanced by the counterweight 55, which is adjustable along the stem 53, and may be secured thereto by set screw 55—1. Appurtenances include an initial live chain portion.

The provision of the auxiliary edge for supporting the live end of the variable weight chain instead of attaching the chain directly to the beam, constitutes an important part of this invention.

The auxiliary edge and its counterweight preferably form one integral and continuous part.

In order that a precision balance shall remain permanently in adjustment under varying degrees of temperature and other changes due to climatic conditions, it is desirable that the structure of the beam be kept free from any attachments thereto by means of screws, rivets, soldering or other modes of connection. This desirable condition is fully attained in the present invention.

Attaching the variable weight to an auxiliary arm has the further advantage of bringing the whole variable weight mechanism well toward the front of the balance, for convenient observation of the person using the balance.

The auxiliary edge as shown in the present instance, permits the lever arm upon which the auxiliary edge is supported, to be made very short, thus bringing the auxiliary edge very close to the center edge.

This feature enables me to advantageously apply the variable weight principle to assay balances, a result which can hardly be attained in the conventional construction, where the chain hook is attached directly to the beam. Again, the necessity for attaching the counterweight directly to the beam, is also avoided and the advantage secured of having the center edge of the beam located directly between the chain hook and its counterweight.

In using the balance, the pointer 70 is first brought to the central position on the index plate 71, by lengthening or shortening the live portion 60 of the variable weight chain, this being accomplished by turning the hand wheel 52 in the proper direction. The position of the zero point for the weight indicator 65 is thus established. Next, the weight scale 32 is moved up or down, by means of the nut 37, until the zero line coincides with the mark on the weight indicator 65. The device is now ready for use.

The weighing is accomplished by lowering the weight indicator 65 until the oscillating system is again brought into equilibrium to compensate for the load, and when so equilibrated, the weight in milligrams and fractions thereof, may be read off directly from the weight scale.

With the present efficient and simple arrangement, a balance can be quickly and accurately equilibrated, and made ready for the weighing operation. Also, it eliminates the clumsy expedient found in other balances, of screwing balance weights attached to the beam, in or out, and even worse, that of shifting the index plate sideways to suit the pointer.

The stem 53—1 constitutes an auxiliary arm of the oscillating system, and is specially provided to carry the auxiliary edge 56. While for convenience, I designate the entire U-shape member 56 as the auxiliary edge, yet the only portion thereof which functions as such, is the knife-like edge 56—2, formed preferably along the circumference of a circular opening defined in the depending leg 56—3. The hook 59 thus rests on a sharp edge, thereby causing the chain 60 to coincide with the center line of the leg 56—3, in substantially an exact manner.

Broadly, the block 38 and the weight indicator 65 may together be referred to as the indicating member, and as constituting floating means for carrying the live end 60 of the chain.

In order to return the weight scale to its mean initial position, a finger 75, rigidly attached to the column 28, and having a registry mark on its front face, is provided.

I am aware that it is old to construct a balance with a variable chain weight, also that it is old to use a flexible cord with operating means for actuating a movable block to which one end of said chain weight is attached, said block being movable along a stationary scale. Therefore, I do not claim these elements broadly, but only in combination with the adjustable scale, the auxiliary edge for supporting the dead end of the chain weight, and the various appurtenances relating thereto.

While a specific embodiment of this invention is herein shown and described, it is to be clearly understood that all the detailed parts thereof, may or may not be shown in the preferred forms, and further, that the preferred forms may be varied from time to time, as the development of this invention and the arts to which it appertains, progress. Therefore, that which forms an essential and characteristic part of this invention will be readily discernible from the claims in which its spirit is broadly generalized.

Having fully described my invention, what I claim is:

1. In a variable weight balance, an oscillating system, a flexible weight having one end thereof attached to said oscillating system, means for raising and lowering the other end of the said flexible weight, an indicating member arranged to move in unison with the said other end, a weight scale arranged to register with the said indicating member, and means for adjusting the said weight scale relatively to the said indicating member.

2. A variable weight balance having a casing, a column depending from the top of said casing, a block slidable along said column, a weight scale vertically movable in relation to said column, a flexible weight having one end thereof carried by said block, means for moving said block up and down, and means for adjusting said weight scale upwardly or downwardly to register with significant positions of said block.

3. In a variable weight balance, a column, an indicating member movable along said column, a flexible cord having both ends thereof attached to said indicating member, an operating sheave engaging said flexible cord, means for tensioning said flexible cord, a weight scale adjustably arranged to register with significant positions of said indicating member, and means for rotating said operating sheave.

4. In a variable weight balance having a casing and a base, a column depending from the top of said casing, a working space defined between the lower end of said column and the said base, a weight scale adjustable along said column, a flexible cord operable along said column, a variable weight having one end thereof attached to said flexible cord, and means for indicating on said weight scale any motion imparted to said variable weight.

5. In a weighing device, an oscillating system having an auxiliary arm, a flexible weight having one end thereof suspended from the auxiliary arm, a counterbalance for said auxiliary arm and an initial portion of said flexible weight, floating means for suspending the other end of said flexible weight, a weight scale having a zero graduation, means for causing the said zero graduation to register with the zero position of said floating means, and means for moving said floating means so as to indicate weight quantities on said scale.

6. In a weighing device, an oscillating system having an auxiliary arm, an auxiliary edge mounted on said arm, a flexible weight having one end thereof supported on said auxiliary edge, a flexible cord, means for causing said flexible cord to support the other end of said flexible weight and means for imparting motion to said flexible cord.

7. In a weighing device, an oscillating system having an auxiliary arm, an auxiliary edge adjustable along said auxiliary arm, a flexible weight having one end thereof supported on said auxiliary edge, a flexible cord, means for causing said flexible cord to support the other end of said flexible weight and means for imparting motion to said flexible cord.

8. In a weighing device, an oscillating system having an auxiliary arm, a member having substantially the form of the letter U inverted, an edge defined in one leg of the said U, and means for adjustably positioning said edge longitudinally along said auxiliary arm, a flexible weight having one end thereof supported on said edge, a flexible cord, means for causing said flexible cord to support the other end of said flexible weight and means for imparting motion to said flexible cord.

9. In a weighing device, an oscillating beam having means defining a center edge, an auxiliary arm carried by said edge, means defining an auxiliary edge mounted on said auxiliary arm, a flexible weight having a live end, means for suspending said live end from said auxiliary edge and means for operably manipulating the other end of said flexible weight.

10. In a weighing device, an oscillating beam having means defining a center edge, an auxiliary arm carried by said edge, means defining an auxiliary edge mounted on said auxiliary arm, a chain having a live end, means for suspending said live end from said auxiliary edge and means for manipulating the other end of said chain.

11. In a weighing device, an oscillating beam having means defining a center edge, an auxiliary arm carried by said edge, means defining an auxiliary edge mounted on said auxiliary arm, a variable weight having a live end, means for suspending said live end from said auxiliary edge and means for operably manipulating the other end of said variable weight.

12. In a weighing device, an oscillating system having an auxiliary arm, an auxiliary edge mounted on said auxiliary arm, a flexible weight having a live end, said live end being carried by said auxiliary edge, means for operatively moving the other end of said flexible weight and a weight scale arranged in adjustable relation to said other end of said flexible weight.

13. In a weighing device, an oscillating system having an auxiliary arm, an auxiliary edge mounted on said auxiliary arm, a chain having a live end, said live end being carried by said auxiliary edge, means for operatively moving the other end of said chain, and a weight scale arranged in adjustable relation to said other end of said chain.

14. In a weighing device, an oscillating system having an auxiliary arm, an auxiliary edge mounted on said auxiliary arm, a variable weight having a live end, said live end being carried by said auxiliary edge, means for operatively moving the other end of said variable weight, and a weight scale arranged in adjustable relation to said other end of said variable weight.

In testimony whereof, I sign my name hereto.

WILFRID HEUSSER.